United States Patent [19]

Ogino

[11] Patent Number: 5,235,577
[45] Date of Patent: Aug. 10, 1993

[54] INFORMATION RECORDING AND/OR REPRODUCING APPARATUS FOR TIMING SWITCHING OF A JUMPING PULSE FROM AN INTERMITTENTLY DETECTED TRACKING SIGNAL

[75] Inventor: Tsukasa Ogino, Yokohama, Japan

[73] Assignee: Canon Kabushiki Kaisha, Tokyo, Japan

[21] Appl. No.: 925,290

[22] Filed: Aug. 6, 1992

Related U.S. Application Data

[63] Continuation of Ser. No. 604,892, Oct. 31, 1990, abandoned.

[30] Foreign Application Priority Data

| Nov. 2, 1989 | [JP] | Japan | 1-284933 |
| Jan. 9, 1990 | [JP] | Japan | 2-962 |
| Oct. 23, 1990 | [JP] | Japan | 2-286394 |

[51] Int. Cl.$^5$ .............................................. G11B 7/00
[52] U.S. Cl. .................................. 369/32; 369/44.28; 369/44.34
[58] Field of Search ............... 369/32, 44.11, 44.28, 369/44.34, 44.35, 44.27, 43, 44.41, 47, 48, 124, 50

[56] References Cited

U.S. PATENT DOCUMENTS

| 4,286,318 | 8/1981 | Immink et al. ............ 369/44.35 X |
| 4,539,664 | 9/1985 | Deguchi et al. . |
| 4,577,300 | 3/1986 | Katsuyama et al. .................. 369/43 |
| 4,611,315 | 9/1986 | Ogino ..................................... 369/33 |
| 4,613,963 | 9/1986 | Hirano . |
| 4,775,966 | 10/1988 | Miura et al. . |
| 4,817,069 | 3/1989 | Shigemori .......................... 369/43 X |
| 4,833,664 | 5/1989 | Shiragami et al. . |
| 4,872,152 | 10/1989 | Tsuyoshi et al. . |
| 4,910,722 | 3/1990 | Kaji et al. ............................. 369/32 |
| 4,932,013 | 6/1990 | Kojima ........................ 369/44.28 X |
| 4,933,922 | 6/1990 | Yokogawa .................... 369/44.34 X |

FOREIGN PATENT DOCUMENTS

| 0290024 | 11/1988 | European Pat. Off. ..... 369/44.28 X |
| 0296338 | 12/1988 | European Pat. Off. ..... 369/44.28 X |
| 309704 | 5/1989 | European Pat. Off. . |
| 352131 | 1/1990 | European Pat. Off. . |
| 62-52767 | 3/1987 | Japan . |
| 0048621 | 3/1988 | Japan . |
| 63-173278 | 7/1988 | Japan . |

Primary Examiner—Aristotelis Psitos
Assistant Examiner—Thang V. Tran
Attorney, Agent, or Firm—Fitzpatrick, Cella, Harper & Scinto

[57] ABSTRACT

An information recording and/or reproducing apparatus includes an optical system for irradiating a light beam to one of tracks arranged in parallel on a recording medium, an actuator for moving the optical system across the tracks, a circuit for alternately applying a jumping signal and a braking signal of the opposite polarity to the actuator to direct the light beam to a desired track, a tracking signal detector for intermittently sampling a tracking error signal varying between a positive value and a negative value with the movement of the optical system across the tracks, a memory for storing the sampled signals, and a switching timing detector for multiplying or adding the sampled signal and the previously sampled signal stored in the memory and causing the signal application circuit to switch from the jumping signal to the braking signal when the product or sum is zero or negative.

22 Claims, 10 Drawing Sheets

TRACKING ERROR SIGNAL

CURRENT APPLIED TO ACTUATOR

TRACKING
ERROR
SIGNAL

CURRENT
APPLIED
TO
ACTUATOR

INFORMATION RECORDING AND/OR REPRODUCING APPARATUS FOR TIMING SWITCHING OF A JUMPING PULSE FROM AN INTERMITTENTLY DETECTED TRACKING SIGNAL

This application is a continuation of application Ser. No. 604,892 filed Oct. 31, 1990, which is now abandoned.

BACKGROUND OF THE INVENTION

1. Field of the Invention

The present invention relates to an apparatus for recording and/or reproducing information on and/or from a recording medium having a plurality of tracks arranged thereon.

2. Related Background Art

An optical disk has been known as a recording medium. On the optical disk, a plurality of concentric or spiral tracks are formed. Those tracks are divided into a plurality of sectors in order to record variable length data and enhance the accessing speed. The information is recorded and reproduced sector by sector.

In the prior art, an apparatus shown in FIG. 1 has been used to record and/or reproduce information on and/or from the optical disk. In FIG. 1, numeral 1 denotes an optical disk, and numeral 2 denotes an optical system for recording and/or reproducing information by focusing a light beam emitted from a light source (not shown) onto one of the tracks on the optical disk 1. The light beam reflected by the optical disk 1 is received by a tracking error detector 3 and a focusing error detector 4 so that a tracking error signal and a focusing error signal are detected by a known principle. The detected focusing error signal is supplied to a focus actuator 9 which controls the focusing by moving the optical system 2 along an optical axis thereof in accordance with the input focusing error signal. The tracking error signal detected by the tracking error detector 3 is supplied to a tracking actuator 8 through a switch 22. The tracking actuator 8 controls the tracking by moving the optical system 2 perpendicular to the optical axis thereof across the track in accordance with the input tracking error signal.

On the other hand, when the light beam is to be directed to a desired track from the currently irradiating track, the switch 22 is switched from a position a to a position b and a pulse signal is applied from a pulse generator to the tracking actuator 8. As shown in FIG. 2B, the pulse signal comprises a positive-going pulse signal (jumping pulse) for accelerating the optical system 2 toward the desired track and a negative-going pulse signal (braking pulse) for decelerating the optical system 2. The switching of the signal from the jumping pulse to the braking pulse is effected in accordance with a timing signal supplied from a zero-crossing detector 20. The zero-crossing detector 20 generates the timing signal based on the tracking error signal produced by the tracking error detector 3. The tracking error signal varies between a positive value and a negative value with a period corresponding to a track pitch as shown in FIG. 2A as the optical system 2 is moved across the track. The zero-crossing detector 20 detects a point A (zero-crossing point) at which the tracking error signal reaches zero and sends the timing signal to the pulse generator 21, which switches the jumping pulse and the braking pulse at the point A in accordance with the timing signal. At a point B at which the light beam reaches the desired track, the output of the braking pulse is stopped and the movement of the light beam or so-called jump operation is terminated.

However, in the apparatus in which the jumping signal is switched at the zero-crossing point of the tracking error signal, a problem occurs where a method for intermittently detecting the tracking error signal, for example, a sample servo system is used. This is explained below.

In the sample servo system, a servo area is provided for each sector. As shown in FIG. 3A, wobbled pits and a clock pit are performed in each servo area. The clock pit is recorded on the track and the wobbled pits are recorded in front of and behind the clock pit and staggered from the track on both sides thereof.

In such a servo area, when the light beam spot is on the track, an output signal as shown in FIG. 3B is produced and the tracking error signal is zero through the processing of $T_A - T_B$. As shown in FIG. 3A, where the light spot deviates somewhat from the track toward the wobbled pit A, the AT error signal S is produced through the processing of $T_A - T_B$ as shown in FIG. 3C. When the light spot moves across the track, the value of $T_A - T_B$ changes as shown in FIG. 4.

In this manner, in the sample servo system, the AT error signal is produced discretely for each sector because each sector has the servo byte as shown in FIG. 3A. Accordingly, when the light beam moves across the track, the sampling point having zero value is not always obtained. Thus, in the configuration shown in FIG. 1, the timing signal for commanding the switching of the jump pulse may not be produced.

The above problem is encountered not only in a sample servo system but in other system in which the tracking error signal is intermittently detected. For example, in a method of sampling the signal produced by the tracking error detector at a predetermined period and processing the sampled signals by a digital signal processor (DSP) to produce the tracking error signal, the problem described above is encountered because the error signal is intermittent.

SUMMARY OF THE INVENTION

It is an object of the present invention to provide an information recording and/or reproducing apparatus which assures the positive detection of a switching timing for a jumping signal based on an intermittently detected error signal.

The above object of the present invention is achieved by an apparatus for recording and/or reproducing information on and/or from a recording medium having an plurality of tracks arranged in parallel thereon, comprising:

means for recording and/or reproducing information on and/or from one of the tracks, means for moving the recording and/or reproducing means across the tracks;

means for alternately applying a jumping signal and a braking signal having the opposite polarity to that of the jumping signal to the moving means to position the recording and/or reproducing-means to a desired track;

means for intermittently sampling a tracking error signal varying with the movement of the recording and/or reproducing means across the tracks;

the tracking error signal varying between a positive value and a negative value at a period corresponding to a track pitch;

means for storing signals sampled by the sampling means; and switching timing detection means for multiplying or adding the sampled signal and the previously sampled signal stored in the storing means for each sampling and causing the signal application means to switch from the jumping signal to the braking signal when the product or sum is zero or negative.

According to another aspect of the present invention, the above object is achieved by an apparatus for recording and/or reproducing information on and/or from a recording medium having a plurality of tracks parallelly arranged thereon, comprising:

means for recording and/or reproducing information on and/or from one of the tracks;

means for moving the recording and/or reproducing means across the tracks;

means for alternately applying a jumping signal and a braking signal having the opposite polarity to that of the jumping signal to the moving means to position the recording and/or reproducing means to a desired track;

means for intermittently sampling a tracking error signal varying with the movement of the recording and/or reproducing means across the tracks;

the tracking error signal varying between a positive value and a negative value at a period corresponding to a track pitch;

means for storing signals sampled by said sampling means; and switching timing detecting means for estimating a signal to be sampled next based on the sampled signal and the previously sampled signal stored in said memory, multiplying or adding the estimated signal and the signal sampled this time, and causing said signal application circuit to switch from the jumping signal to the braking signal when the product or sum is zero or negative.

DETAILED DESCRIPTION OF THE PREFERRED EMBODIMENTS

Figure 1:
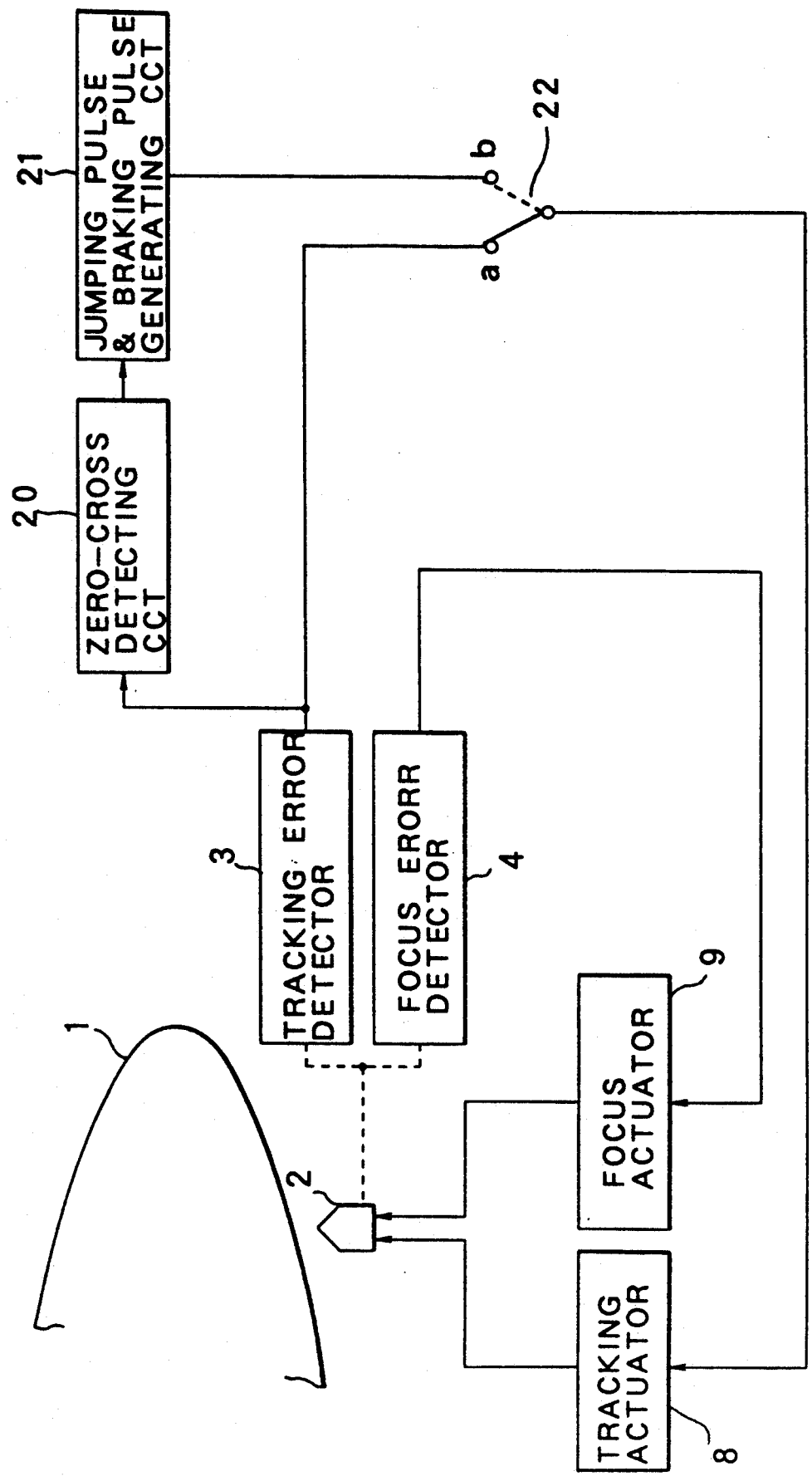
FIG. 1 shows a block diagram of a configuration of a prior art information recording and/or reproducing apparatus.
Figure 2:
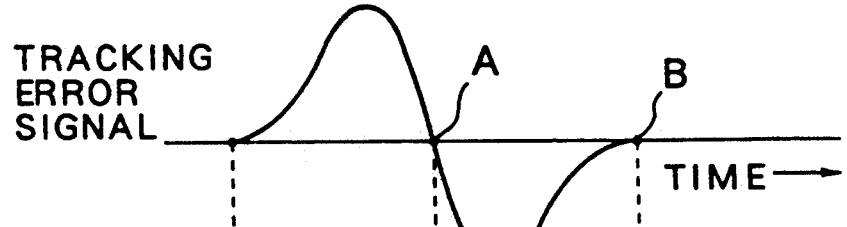
FIGS. 2A and 2B show timing charts for a tracking error signal and a jumping signal in the apparatus of FIG. 1, FIGS. 3A to 3C illustrate a principle of the tracking error signal detection in a sample servo system.
Figure 2:
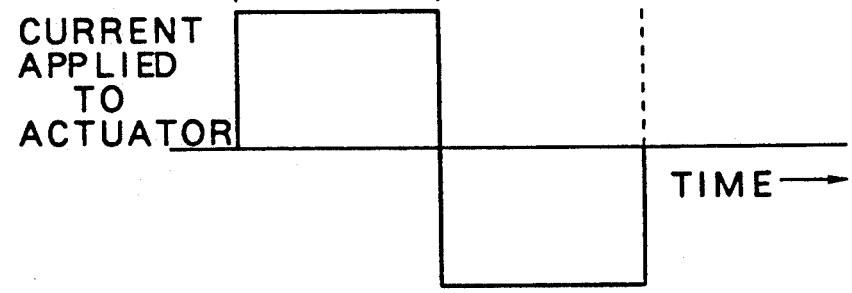
Figure 4:
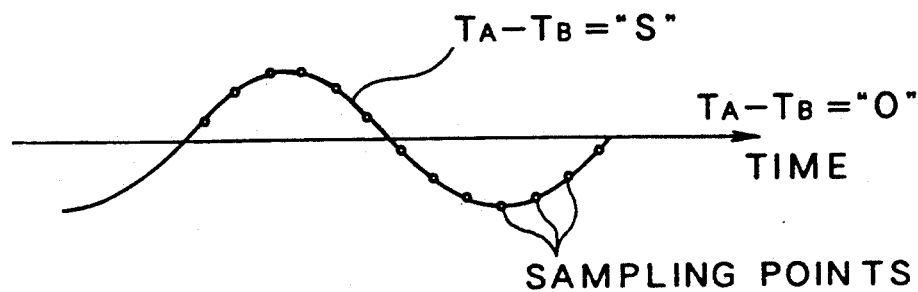
FIG. 4 shows a timing chart for a tracking error signal detected in the sample servo system.
Figure 3A:
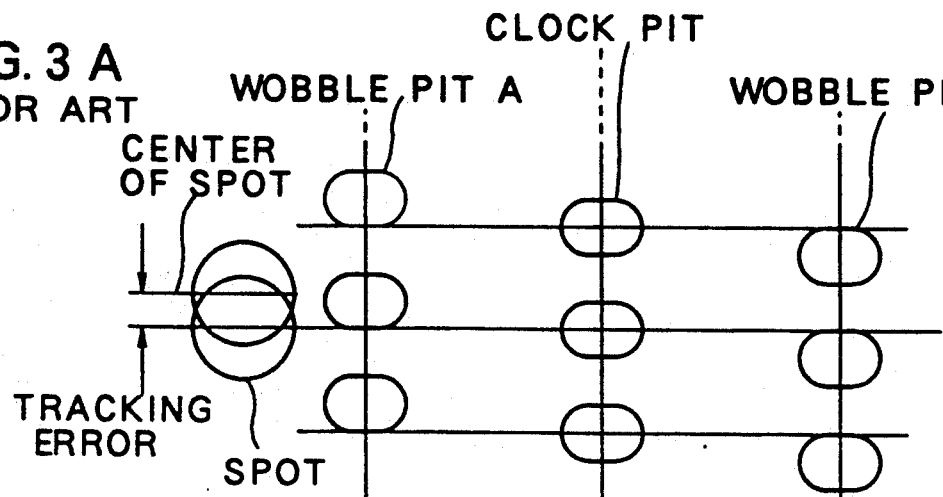
Figure 3B:
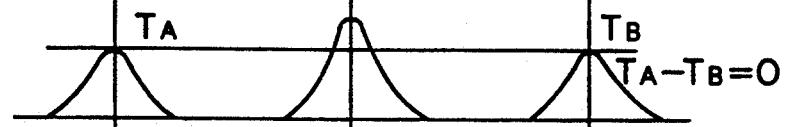
Figure 3C:
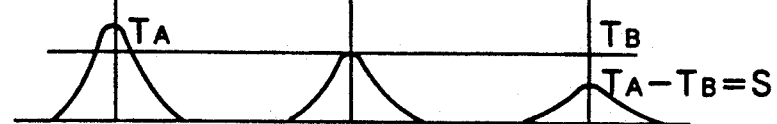
Figure 5:
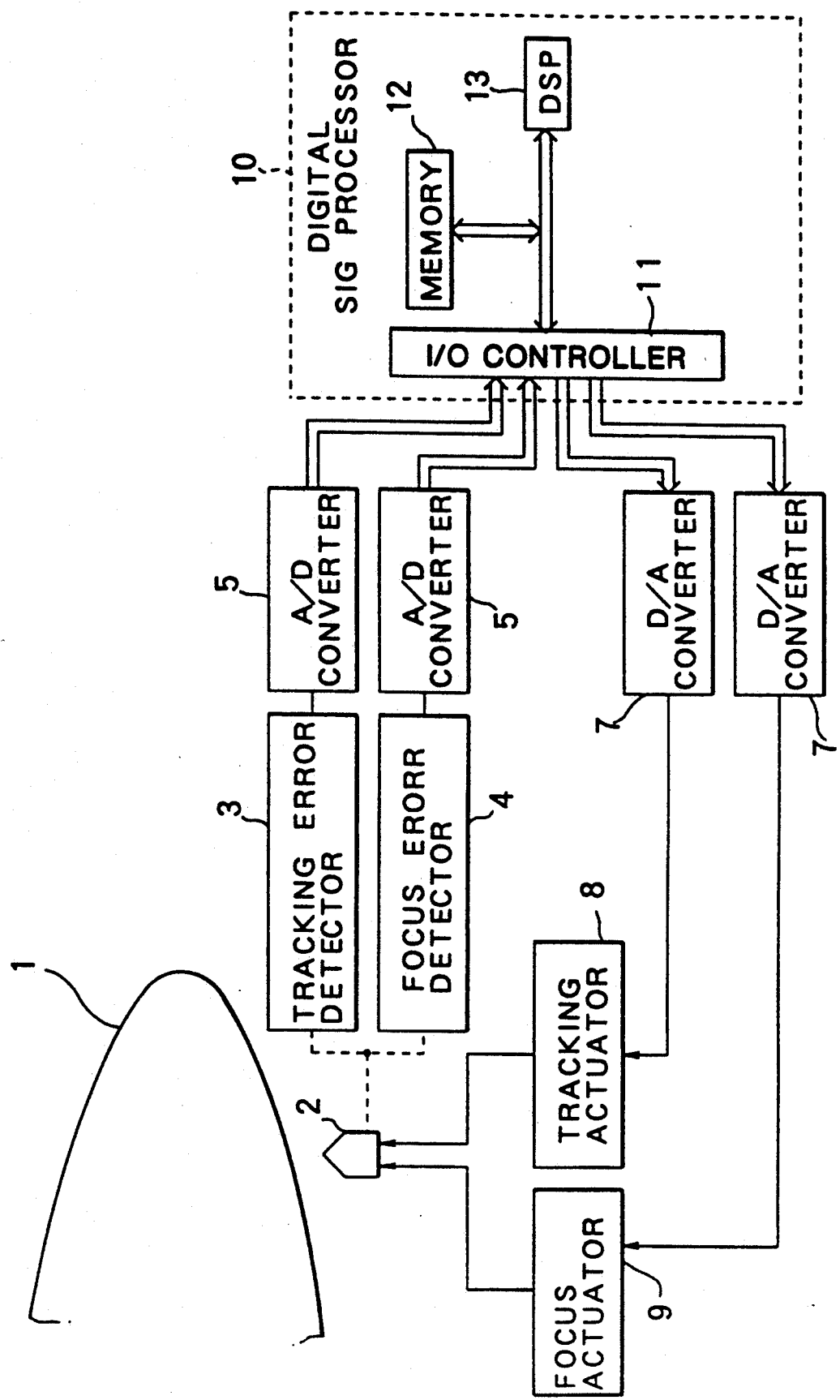
FIG. 5 shows a block diagram of one embodiment of an information recording and/or reproducing apparatus of the present invention.

FIG. 5 shows a block diagram of one embodiment of an information recording and/or reproducing apparatus of the present invention. In FIG. 5, the elements like those shown in FIG. 1 are designated by the same numerals and the explanation thereof is omitted.

In FIG. 5, a digital signal processor 10 is a control circuit for controlling the movement of an optical system 2 based on a servo error information derived from an optical disk 1. A tracking error detector 3 and a focusing error detector 4 sample a tracking error signal and a focusing error signal, respectively, at a predetermined interval, and supply them to the digital signal processor 10 through an analog/digital (A/D) converter 5. The servo error information is supplied to a memory 12 through an input/output (I/O) controller 11 and stored therein sample by sample. A digital signal process (DSP) 13 processes the servo error information supplied at each sampling and the servo error information at the previous sampling stored in the memory 12 and sends a control signal to the actuators 8 and 9 through a digital/analog (D/A) converter 7 to control the movement of the optical system 2 as well be described later.

Figure 6:
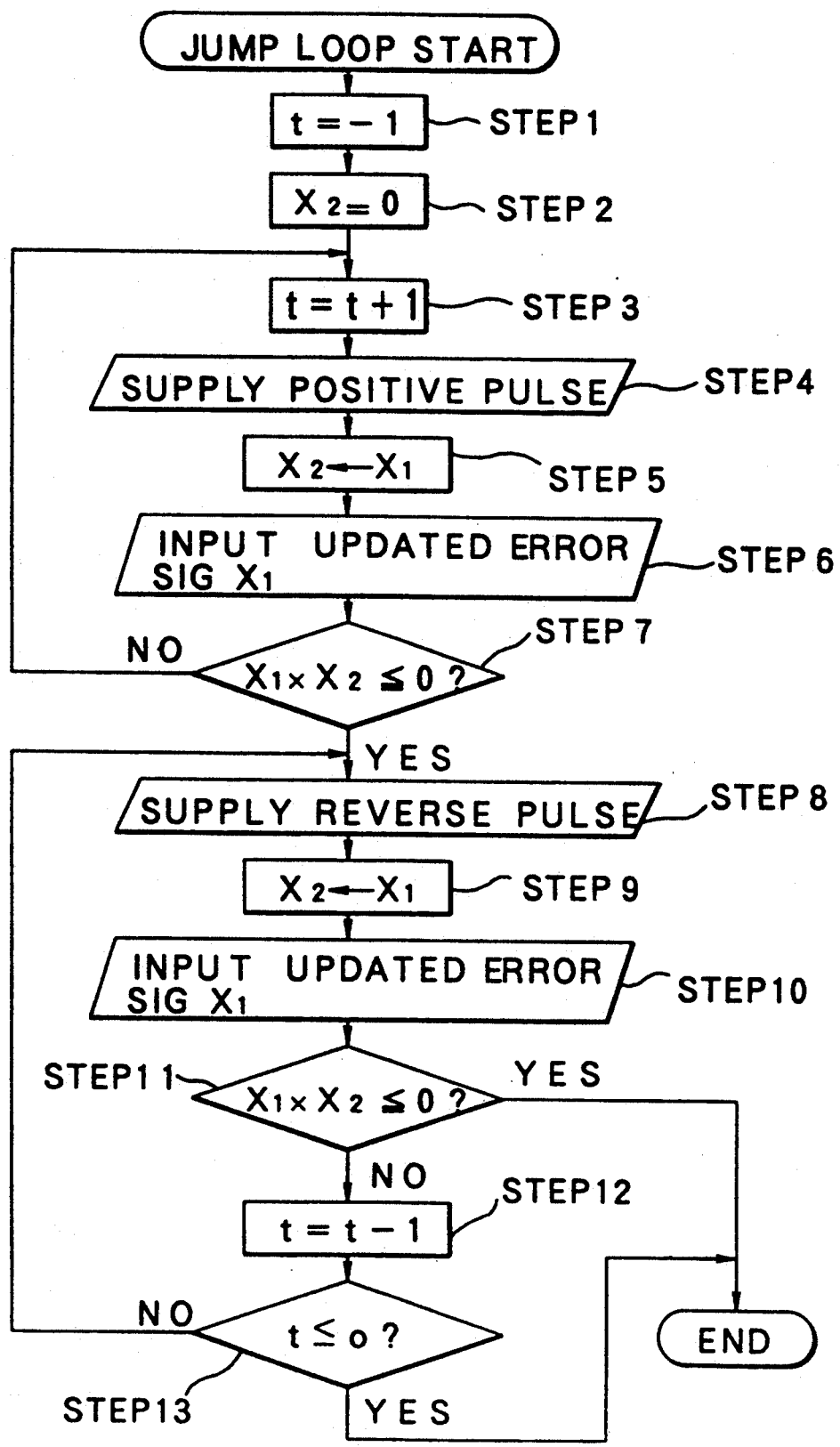
FIG. 6 shows a flow chart for illustrating a jumping operation in the apparatus of FIG. 5, FIGS. 7A and 7B show timing charts for a tracking error signal and a jumping signal in the apparatus of FIG. 5.

The operation of the present embodiment is now explained with reference to a flow chart shown in FIG. 6, which explains a control operation when the optical system 2 jumps across the track in one direction by the tracking error signal.

Figure 7A:
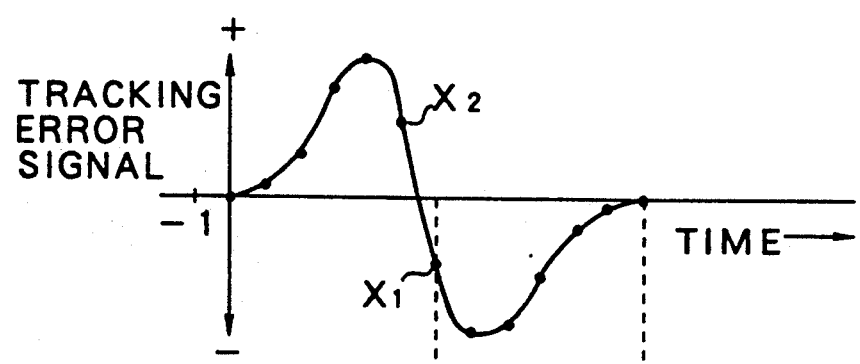
Figure 7B:
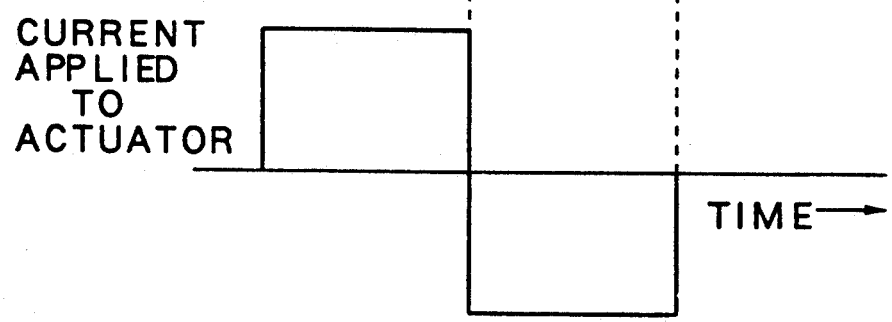

A time $t=-1$ shown in a step 1 indicates a time prior to the detection of the tracking error signal. As shown in FIG. 7A, a jumping pulse is not produced at $t=-1$. In steps 2 and 3, the next samplings are effected and the tracking error signal $X_2$ reaches zero as shown in FIG. 7A. As a result, in a step 4, the DSP 13 issues a command signal to the tracking actuator 8 through the I/O controller 11 and the D/A converter 7 to apply the jumping pulse. The tracking actuator 8 functions to drive the optical system 2 across the track and comprises an actuator and a driver therefor. Thus, in response to the command signal, the driver supplies a predetermined signal (jumping signal) as shown in FIG. 7B to the actuator so that the jumping of the optical system 2 is started.

In a step 5, the DSP 13 stores the tracking error signal which has been sampled at the previous time, in the memory 12. The storing in the memory 12 is effected at each sampling so that the tracking error signal at the previous sampling is always maintained in the memory 12. In a step 6, the next sampling is effected and the resulting tracking error signal $X_1$ is read into the DSP 13. In a step 7, the DSP 13 processes the error signal $X_1$ of the current sampling and the error signal $X_2$ of the previous sampling stored in the memory 12. Specifically, the previous error signal $X_2$ and the current error signal $X_1$ are multiplied to determine if the product meets $X_1 \times X_2 \leq 0$. If the product is zero or negative, it indicates that the zero-crossing point of the AT error signal is between the previous sampling time and the current sampling time. For each sampling, the steps 3 to 7 are repeated, and when the current sampling time exceeds the zero-crossing point as shown in FIG. 7A, the product at the DSP 13 is zero or negative and meets the condition of $X_1 \times X_2 \leq 0$.

Thus, in a step 8, the DSP 13 determines that the error signal has passed the zero-crossing point and commands the tracking actuator 8 to apply a reverse pulse signal (braking signal). Since the sampling time thereof is closest to the zero-crossing point, that timing is selected as the current direction switching timing for the tracking actuator 8. As a result, as shown in FIG. 7B, the reverse pulse current is applied to the tracking actuator 8 at the sampling time which meets the condition of the step 7.

In steps 9 to 11, the operation is same as that in steps 5 to 7. The error signal at the previous sampling is stored in the memory 12 and it is multiplied with the error signal of the current sampling to determine if the product meets the condition of $X_1 \times X_2 \leq 0$. If the condition is met in the step 11, it means that the tracking error signal again crossed the zero line, and the application of the reverse pulse current is stopped and the jump operation is terminated. Before the termination, in actual, the number of times t of sampling at the time of application of the positive-going pulse is decremented by one in a step 12, and the difference is checked to determine if it meets a condition of $t \leq 0$ in a step 13. The steps 8 to 13 are repeated until the above condition is met. When the same number of times of sampling as the number of times of sampling under the application of the positive-going pulse is effected, the application time of the reverse pulse to the tracking actuator 8 amounts to the application time of the positive-going pulse. At the time point, the application of the reverse pulse is stopped. Accordingly, if the respective conditions are met in the steps 11 to 13, the DSP 13 commands the tracking actuator 8 to stop the application of the reverse pulse so that the application of the reverse pulse is terminated as shown in FIG. 7B.

In FIG. 7A, the sampling points are shown by dots on the tracking error signal. For the purpose of simplification of explanation, the number of times that sampling is performed is small. In actuality, the number of times of sampling is greater and an error of the tracking error signal at the zero-crossing point is minor so that exact detection is attained.

In the present embodiment, the DSP 13 multiplies the error signal of the previous sampling with the error signal of the current sampling and determines the current direction switching timing of the actuator based on the product. Alternatively, those error signals may be added. In this case, if a sum is zero or negative, it means that the zero-crossing point of the AT error signal is between the sampling time points. Accordingly, the current direction of the actuator may be switched when the sum is zero or negative.

Figure 8:
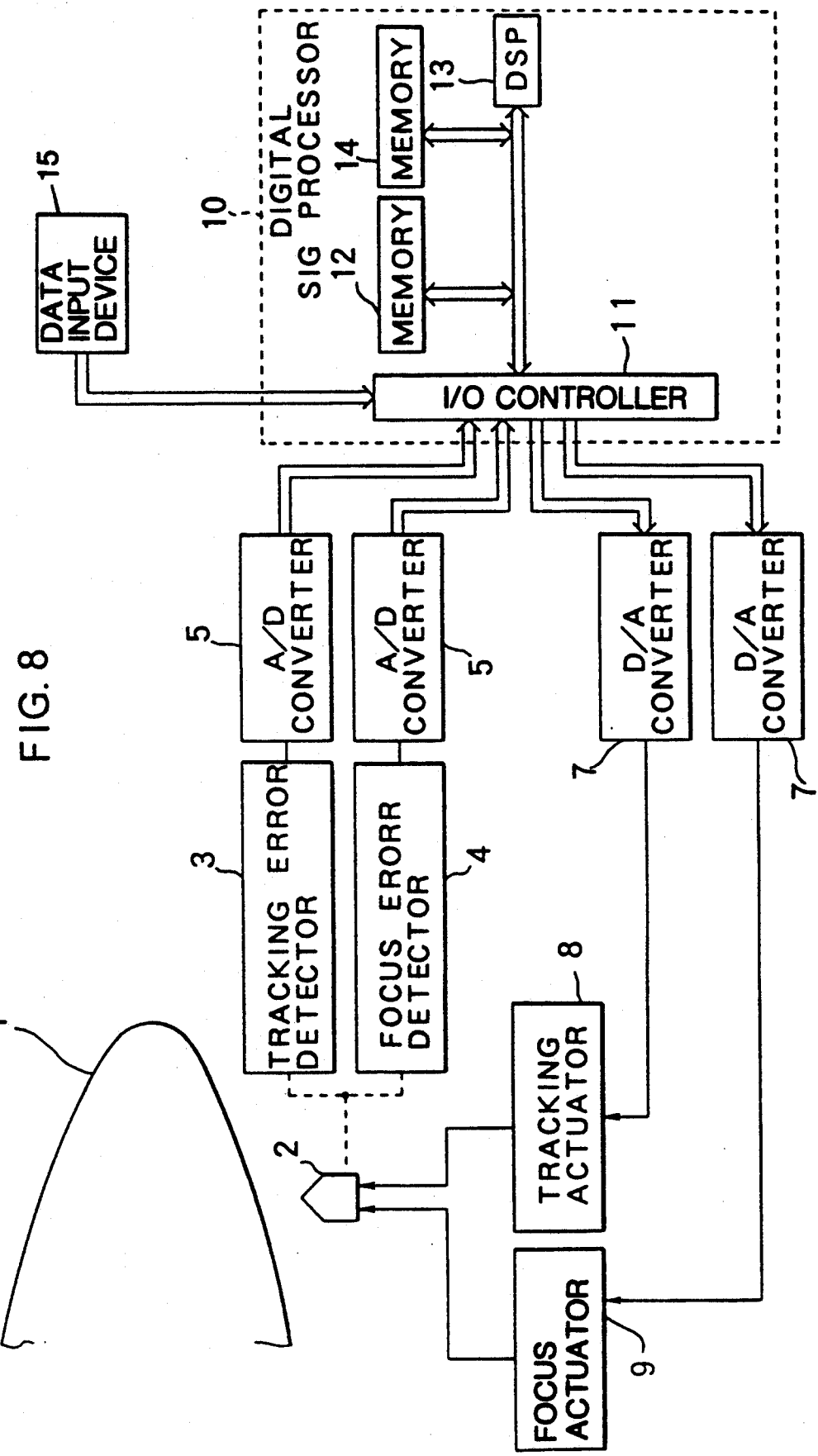
FIG. 8 shows a block diagram of another embodiment of the information recording and/or reproducing apparatus of the present invention.

FIG. 8 shows a block diagram of another embodiment of the information recording and/or reproducing apparatus of the present invention. In FIG. 8, elements like those shown in FIG. 5 are designated by like numerals and the detailed explanation thereof is omitted.

The apparatus of FIG. 8 differs from the apparatus of FIG. 5 in that data such as control parameters are inputted to the I/O controller 11 from a data input device 15. The digital signal processor 10 in the present embodiment has another memory 14 in addition to the memory 12.

The jump operation in the apparatus of FIG. 8 is explained with reference to a flow chart of FIG. 9.

Figure 9:
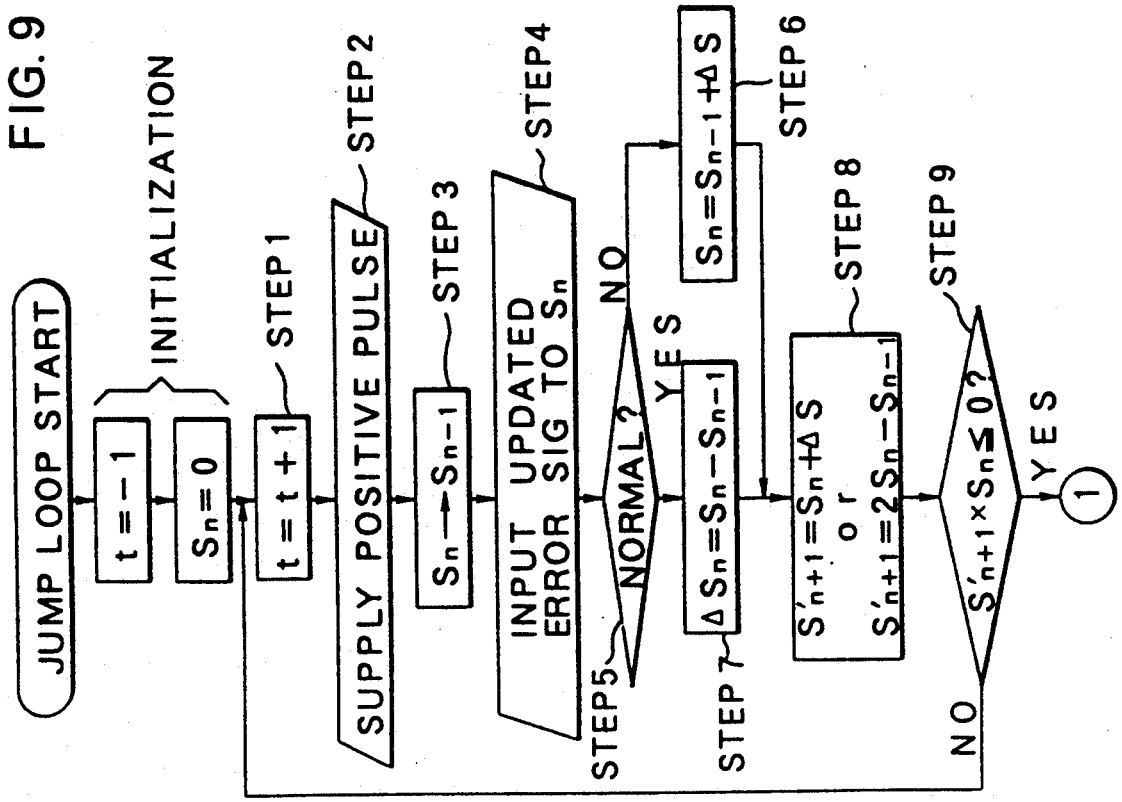
FIG. 9 shows a flow chart for explaining the jumping operation in the apparatus of FIG. 8, FIGS. 10A and 10B show timing charts for a tracking error signal and a jumping signal in the apparatus of FIG. 8.

In FIG. 9, when one-track forward jump is set, a jump counter variable t is set to $-1$ and a tracking error signal variable $S_n$ is set to zero. After the initialization, one is added to the jump counter variable t in a step 1, and a predetermined jumping pulse is applied to the tracking actuator 8 in a step 2. The DSP 13 issues a control signal through the I/O controller 11 and it is converted to an analog signal by the D/A converter 7. Thus, a jumping pulse is supplied to the tracking actuator.

In a step 3, the error signal $S_n$ is transferred to the previous error signal variable $S_{n-1}$. In a step 4, the latest error signal is set to the error signal variable $S_n$. Namely, the previous error signal is stored into $S_{n-1}$ and the error signal $S_n$ of the current sampling is stored into $S_n$. The memory 12 is used to store $S_{n-1}$ and the memory 14 is used to store $S_n$. In a step 5, the DSP 13 determines whether the error signal is normal or not, and if it is in error due to a defect in a recording medium, or damage or dust, the process proceeds to a step 6. In the step 6, a difference $\Delta S = S_{n-1} - S_{n-2}$ between the second preceding data $S_{n-2}$ and the first preceding data $S_{n-1}$ is added to the first preceding data $S_{n-1}$ stored in the memory 12 to determine the error signal $S_n$.

On the other signal, if the signal is determined to be normal in the step 5, a difference $\Delta S$ from the first preceding error signal $S_{n-1}$ is determined in a step 7, and the resulting $\Delta S$ and $S_n$ are temporarily stored in the memory 12. In a step 8, the error signal $S'_{n+1}$ at the next sampling point is estimated. The estimated error signal $S'_{n+1}$ is determined by the operation of $S'_{n+1} = S_n + \Delta S$ based on $\Delta S$ and $S_n$ previously stored in the memory 12. Alternatively, it may be determined by $S'_{n+1} = 2S_n - S_{n-1}$ based on the current error signal $S_n$ and the previous error signal $S_{n-1}$. In a step 9, the resulting estimated signal $S'_{n+1}$ is multiplied by the current error signal $S_n$ to determine whether the product is zero or negative. Namely, at each sampling, the estimated error signal at the next sampling is determined, and the resulting estimated error signal is multiplied by the current error signal to determine whether the product is zero or negative.

FIGS. 10A and 10B show the tracking error signal and the actuator current, respectively. $S_{12}$ and $S_{13}$ in FIG. 10A show tracking error signals at the respective sampling times. It is assumed that the current error signal is $S_{12}$ and the estimated error signal is $S_{13}'$. The product of $S_{12}$ and $S_{13}'$ is negative because those error signals are on the positive and negative sides. The steps 1 to 9 are carried out for each sampling, and the product is determined to be negative for the first time in the step 9 at the sampling time of $S_{12}$.

If the decision in the step 9 is zero or negative, it means that the error signal will be negative at the next sampling time and the error signal is very close to the zero-crossing point. Accordingly, this time point is selected as the current direction switching timing for the actuator current, and the reverse pulse is applied to the actuator in the step 10. Thus, a negative current (braking signal) is applied to the actuator at the sampling point of $S_{12}$ as shown in FIG. 10B.

After a step $S_{11}$, the same process as that of the steps 1 to 9 is carried out to detect the next zero-crossing point of the tracking error signal. In the step 11, the error signal $S_n$ is transferred to the previous error signal variable $S_{n-1}$. In a step 12, a latest error signal is set into the error signal variable $S_n$. In a step 13, whether the error signal is normal or not is determined, and if it is in error, the operation of $S_{n-1} + \Delta S$ is carried out in a step 14 to produce $S_n$. If the error signal is normal, a difference $\Delta S$ between the previous error signal and the current error signal is determined in a step 15.

In a step 16, an estimated error signal at the next sampling is determined based on $S_n$ and $\Delta S$ in the same manner as that described above. Again, alternatively, the estimation may be made based on the previous error signal $S_{n-1}$ and the current error signal $S_n$. In a step 17, the current error signal $S_n$ is multiplied by the estimated error signal $S'_{n+1}$ to determine whether the product is zero or negative. If the product is positive, the jump counter variable t is decremented by one in a step 18, and whether the counter variable t is zero or not is determined in a step 19. The jump counter variable t holds the number of times of sampling under the application of the positive-going jump pulse. It is decremented by one at each sampling and the process returns to the step 10. Accordingly, the steps 10 to 19 are repeated until the product is determined to be zero or negative in the step 17.

Figure 10:
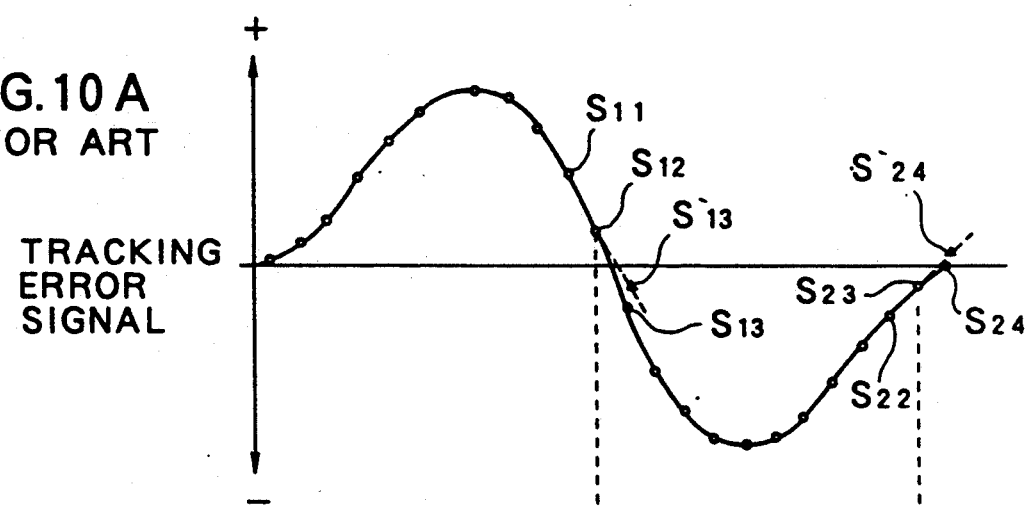
Figure 10:
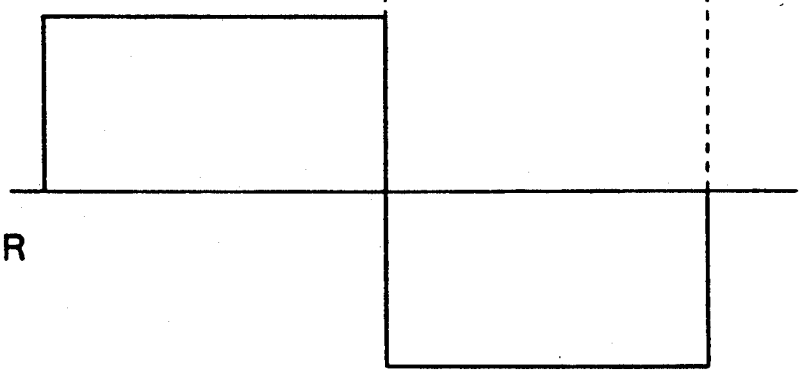

In FIG. 10A, $S_{22}$ to $S_{24}$ are tracking error signals at the respective sampling times, and $S'_{24}$ is an estimated error signal at the $S_{23}$ sampling time. In FIG. 10, the product of $S_{23} \times S_{24}'$ is negative when $S_{23}$ is sampled. Thus, the actuator current is stopped at the $S_{23}$ sampling time. Namely, when $S_{23}$ is sampled in the step 17, the product of $S_{23}$ and $S'_{24}$ is negative and it is determined that the error signal is very close to the zero-crossing point. Accordingly, as shown in FIG. 10B, the actuator current is stopped at the $S_{23}$ sampling point and the jump operation is terminated.

In a step 18, one is decremented from the jump counter variable t at each sampling, and if the variable t reaches zero, the application of the jump pulse is terminated in a step 19. Since the jump counter variable t holds the number of times of sampling under the application of the positive-going jump pulse, the time when the variable t reaches zero is the time at which the negative jump pulse application time is equal to the positive jump pulse application time. Accordingly, the actuator current is stopped when the jump counter variable t reaches zero.

Again, in the present embodiment, the multiplication in the steps 9 and 17 may be substituted by an addition operation so that the polarity of the current applied to the actuator is switched and the application of the current is stopped when the sum is zero or negative.

In the method shown in FIG. 9, the timing to switch the polarity of the current applied to the actuator is detected by processing the currently sampled error signal and the estimated error signal to be next sampled. Alternatively, the timing may be detected by a configuration shown in FIG. 8 in the same manner as that described in connection with FIG. 6. A flow chart of such an operation is shown in FIG. 11.

Figure 11:
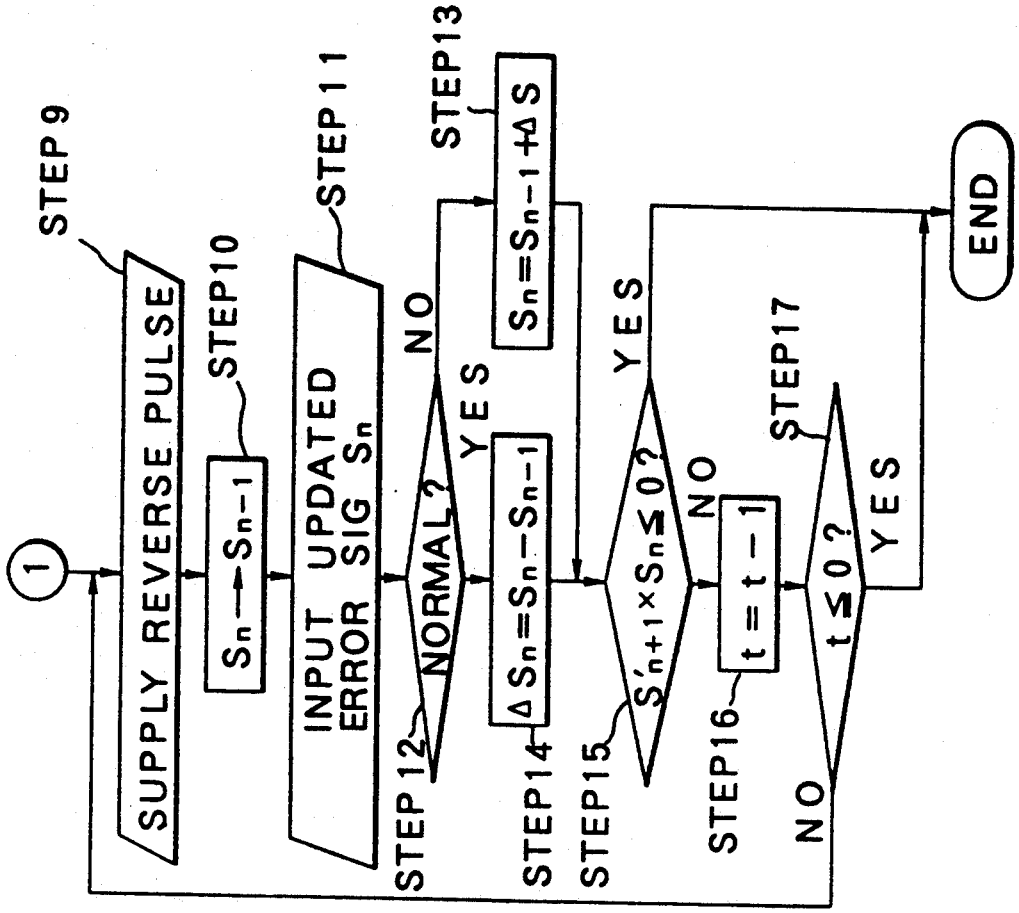
FIG. 11 shows a flow chart for explaining the jumping operation in a further embodiment.
Figure 11:
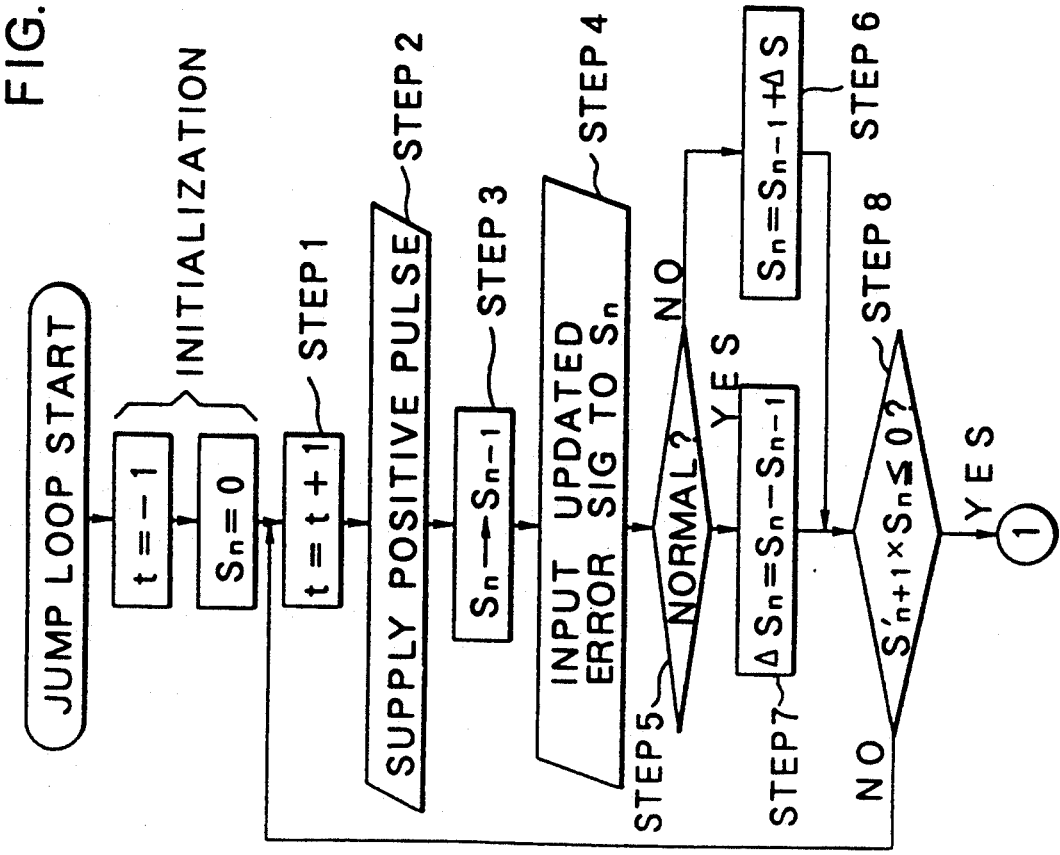

In FIG. 11, steps 1 to 7 are same as the steps 1 to 7 of FIG. 9 and the explanation thereof is omitted. In the present embodiment, the currently sampled error signal $S_n$ and the previous error signal $S_{n-1}$ stored in the memory 12 are multiplied in a step 8. If the product is zero or negative, the process proceeds to a step 9 to apply the reverse pulse (braking pulse) to the actuator.

In the present embodiment, the steps 10 to 14 and the steps 16 and 17 are same as the steps 11 to 15 and the steps 18 and 19 in FIG. 9, respectively, and the explanation thereof is omitted. In the present embodiment, the currently sampled error signal $S_n$ and the previous error signal $S_{n-1}$ stored in the memory 12 are multiplied in the step 15, and if the product is zero or negative, the application of the current to the actuator is stopped and the jump operation is terminated.

The present invention is not limited to the above embodiments but various changes may be made. For example, in the second embodiment, the polarity of the current applied is reversed when the error signal $S_{12}$ is sampled as shown in FIGS. 10A and 10B. Alternatively, a time from the $S_{12}$ sampling time to the zero-crossing may be estimated based on $S_{12}$ and $S'_{13}$, and the polarity of the applied current may be switched at a timing delayed by the estimated time from the $S_{12}$ sampling time. In the above description, the optical disk is used as the medium, but the present invention is applicable to any apparatus which uses a medium having a plurality of tracks arranged in parallel such as magnetic disk or optical card.

The present invention includes all of the above modifications without departing from the scope of claims.

What is claimed is:

1. An apparatus for recording and/or reproducing information on and/or from a recording medium having a plurality of tracks arranged in parallel thereon comprising:

means for recording and/or reproducing information on and/or from one of the tracks;

means for moving said recording and/or reproducing means across the tracks;

means for producing a tracking error signal based on an output signal from said recording and/or reproducing means.

means for serially applying a jumping signal and a braking signal having the opposite polarity to that of the jumping signal to said moving means to position said recording and/or reproducing means to a desired track;

means for intermittently sampling the tracking error signal a plurality of times to produce a plurality of sampled tracking error signals varying with the movement of said recording and/or reproducing means across the tracks, one of the plurality of sampled tracking error signals being a current instantaneous sampled value of the tracking error signal;

the tracking error signal varying between a positive value and a negative value at a period corresponding to a track pitch;

means for storing signals sampled by said sampling means; and switching timing detection means for multiplying or adding two of the plurality of sampled tracking error signals, one of which is stored in said storing means and the other of which is the current instantaneous sampled value of the tracking error signal produced after the sampled tracking error signal stored in said storing means and causing said applying means to switch from applying the jumping signal to applying the braking signal when the result of the multiplying is zero or negative or the result of the adding is zero or negative.

2. An apparatus for recording and/or reproducing information according to claim 1 wherein said intermittent sampling means is adapted to produce an abnormal instantaneous sampled value of the tracking error signal, wherein said apparatus further comprises means for estimating a tracking error signal not yet detected based on a previously sampled tracking error signal and a sampled tracking error signal stored in said storing means and produced before the previously sampled tracking error signal when the instantaneous sampled value of the tracking error signal is abnormal.

3. An apparatus for recording and reproducing information according to claim 1, wherein said switching timing detection means stops the application of the braking signal to said moving means when the product or sum of an instantaneous sampled value of the tracking error signal and a previously sampled tracking error signal stored in said storing means becomes zero or negative for two such products or sums.

4. An apparatus for recording and/or reproducing information according to claim 1 wherein said signal application means and said switching timing detection means include digital signal processors.

5. An apparatus for recording and/or reproducing information by irradiating a light beam to a recording medium having a plurality of tracks arranged in parallel thereon comprising:

an optical system for irradiating a focused light beam onto one of the tracks;

an actuator for moving said optical system across the tracks; means for producing a tracking error signal on the basis of a reflected light from said recording medium, said reflected light being produced when said focused light beam is irradiated onto one of the tracks;

a circuit for serially applying a jumping signal and a braking signal having the opposite polarity to that of the jumping signal to said actuator to direct the light beam to a desired track;

a tracking signal detector for intermittently sampling a tracking error signal a plurality of times to produce a plurality of sampled tracking error signals varying with the movement of said optical system across the tracks;

the tracking signal varying between a positive value and a negative value at a period corresponding to a track pitch;

a memory for storing the sampled tracking error signals; and a switching timing detector for multiplying or adding two of the plurality of sampled tracking error signals, one of which is stored in said memory, the other of which is a current instantaneous sampled value of the tracking error signal produced after the sampled tracking error signal stored in said memory and causing said circuit to switch from applying the jumping signal to applying braking signal when the result of the multiplying is zero or negative or the result of the adding is zero or negative.

6. An apparatus for recording and/or reproducing information according to claim 5, wherein said tracking signal detector is adapted to produce an abnormal instantaneous sampled value of the tracking error signal, wherein said apparatus further comprises a circuit for estimating a tracking error signal not yet detected based on a previously sampled tracking signal and a sampled tracking error signal stored in said memory and produced before the previously sampled tracking signal when the current instantaneous sampled value of the tracking error signal is abnormal.

7. An apparatus for recording and/or reproducing information according to claim 5, wherein said switching timing detector stops the application of the braking signal to the actuator when the product or sum of an instantaneous sampled value of the tracking error signal and a previously sampled tracking error signal stored in said memory becomes a zero or negative for two such products or sums.

8. An apparatus for recording and/or reproducing information according to claim 5 wherein said signal application circuit and said switching timing detector include digital signal processors.

9. An apparatus for recording and/or reproducing information on and/or from a recording medium having a plurality of tracks arranged in parallel thereon comprising:

means for recording and/or reproducing information on and/or from one of the tracks;

means for moving said recording and/or reproducing means across the tracks; means for producing a tracking error signal based on an output signal from said recording and/or reproducing means means for serially applying a jumping signal and a braking signal having the opposite polarity to that of the jumping signal to said moving means to position said recording and/or reproducing means to a desired track;

means for intermittently sampling a tracking error signal a plurality of times to produce a plurality of sampled tracking error signals varying with the movement of said recording and/or reproducing means across the tracks;

the tracking error signal varying between a positive value and a negative value at a period corresponding to a track pitch;

means for storing signals sampled by said sampling means; and switching timing detecting means for estimating a tracking error signal not yet sampled based on a current instantaneous sampled value of a tracking error signal and a previously sampled tracking error signal stored in said memory, multiplying or adding the estimated tracking error signal and the current instantaneous sampled value of the tracking error signal and causing said applying means to switch from applying the jumping signal to applying the braking signal when the result of the multiplying is zero or negative or the result of the adding is zero or negative.

10. An apparatus for recording and/or reproducing information according to claim 9, wherein said intermittent sampling means is adapted to produce an abnormal instantaneous sampled value of the tracking error signal, wherein said apparatus further comprises means for estimating a tracking error signal not yet detected based on a previously sampled tracking error signal and a sampled tracking error signal stored in said storing means and produced before the previously sampled tracking error signal when the instantaneous sampled value of the tracking error signal is abnormal.

11. An apparatus for recording and reproducing information according to claim 9, wherein said switching timing detection means stops the application of the braking signal to said moving means when the product or sum of the estimated signal and the instantaneous sampled value of the tracking error signal becomes zero or negative for two such products or sums.

12. An apparatus for recording and/or reproducing information according to claim 9 wherein said signal application means and said switching timing detection means include digital signal processors.

13. An apparatus for recording and/or reproducing information by irradiating a recording medium with a light beam, the recording medium having a plurality of tracks arranged in parallel thereon, comprising:

an optical system for irradiating a focused light beam onto one of the tracks;

an actuator for moving said optical system across the tracks; means for producing a tracking error signal on the basis of a reflected light from said recording medium, said reflected light being produced when said focused light beam 13 is irradiated onto one of the tracks;

a circuit for serially applying a jumping signal and a braking signal having the opposite polarity to that of the jumping signal to said actuator to direct the light beam to a desired track;

a tracking signal detector for intermittently sampling a tracking error signal a plurality of times to produce a plurality of sampled tracking error signals varying with the movement of said optical system across the tracks;

the tracking signal varying between a positive value and a negative value at a period corresponding to a track pitch;

a memory for storing the sampled signals; and a switching timing detector for estimating a tracking error signal not yet sampled based on a current instantaneous sampled value of a tracking error signal and a previously sampled tracking error signal stored in said memory, multiplying or adding the estimated tracking error signal and the current instantaneous sampled value of the tracking error signal and causing said applying means to switch from applying the jumping signal to applying the braking signal when the result of the multiplying is zero or negative or the result of the adding is zero or negative.

14. An apparatus for recording and/or reproducing information according to claim 13, wherein said tracking error signal detector is adapted to produce an abnormal instantaneous sampled value of the tracking error signal, wherein said apparatus further comprises a circuit for estimating a tracking error signal not yet detected based on a previously sampled tracking error signal and a sampled tracking error signal stored in said memory and produced before the previously sampled tracking error signal when the instantaneous sampled value of the tracking error signal is abnormal.

15. An apparatus for recording and/or reproducing information according to claim 13, wherein said switching timing detector stops the application of the braking signal to the actuator when the product of the estimated signal and the instantaneous sampled value of the tracking error signal becomes zero or negative or the sum of the estimated signal and the instantaneous sampled value of the tracking error signal becomes zero or negative for two such products or sums.

16. An apparatus for recording and/or reproducing information according to claim 13 wherein said signal application circuit and said switching timing detector include digital signal processors.

17. A method for recording and/or reproducing information on and/or from a recording medium having a plurality of tracks arranged in parallel thereon by using a light beam, comprising the steps of:

irradiating a focussed light beam onto one of the tracks to record and/or reproduce information;

producing a tracking error signal on the basis of the relative position of the focussed light beam with respect to the track;

moving the light beam across the tracks by serially performing a jumping operation with the light beam and a braking operation with the light beam to direct the light beam to a desired track;

intermittently sampling the tracking error signal a plurality of times to produce a plurality of sampled tracking error signals varying between a positive value and a negative value periodically, with the movement of the light beam across the tracks;

storing the sampled tracking error signals;

multiplying or adding two of the plurality of sampled tracking error signals, one of which is stored in said storing step, and other of which is the current instantaneous sampled value of the tracking error signal; and switching from the jumping operation to the braking operation when the result of the multiplying is zero or negative or the result of the adding is zero or negative.

18. A method according to claim 17, wherein said intermittent sampling step produces an abnormal instantaneous sampled value of the tracking error signal, wherein said method further comprises the step of estimating a tracking error signal not yet detected based on a previously sampled tracking error signal and a sampled tracking error signal stored in said storing step and produced before the previously sampled tracking error signal, when the instantaneous sampled value of the tracking error signal is abnormal.

19. A method for recording and/or reproducing information on and/or from a recording medium having a plurality of tracks arranged in parallel thereon by using a light beam, comprising the steps of:

irradiating a focussed light beam onto one of the tracks to record and/or reproduce information;

producing a tracking error signal on the basis of the relative position of the focussed light bean with respect to one of the plurality of tracks;

moving the light beam across the tracks by serially performing a jumping operation and a braking operation with the light bean to direct the beam to a desired track;

intermittently sampling the tracking error signal a plurality of times to produce a plurality of sampled tracking error signals varying between a position value and a negative value periodically, with the movement of the light beam across the tracks;

storing the sampled tracking error signals;

estimating a tracking error signal not yet sampled based on a current instantaneous sampled value of a tracking error signal and a previously sampled tracking error signal stored in said storing step;

adding or multiplying the estimated signal to or by a current instantaneous sampled value of the tracking error signal; and switching from the jumping operation to the braking operation when the result of the multiplying is zero or negative or the result of the adding is zero or negative or the result of the adding is zero or negative.

20. A method according to claim 19, wherein said intermittent sampling step produces an abnormal instantaneous sampled value of the tracking error signal, wherein said method further comprises the step of estimating a tracking error signal not yet detected based on a previously sampled tracking error signal and a sampled tracking error signal stored in said storing step and produced before the previously sampled tracking error signal, when the instantaneous sampled value of the tracking error signal is abnormal.

21. An apparatus for recording and/or reproducing information by irradiating a recording medium with a light beam, the recording medium having a plurality of tracks arranged in parallel thereon, said apparatus comprising:

an optical system for irradiating one of the tracks with the light beam;

an actuator for moving said optical system relative to the recording medium;

a drive circuit for applying a driving current to said actuator to drive said actuator;

a circuit for generating an error signal indicating an irradiation state of the light beam, from reflected light produced when the light beam irradiates one of the tracks;

an error signal detector for intermittently sampling the error signal a plurality of times to produce a plurality of sampled error signals varying with the movement of said optical system, wherein the error signal periodically varies between a positive value and a negative value with respect to a zero level of the error signal;

a memory for storing the sampled error signals; and a control circuit for multiplying or adding two of the plurality of sampled error signals, one of which is stored in said memory, and the other of which is a current instantaneous sampled value of the error signal produced after the sampled error signal stored in said memory, and for causing said drive circuit to vary the driving current applied to said actuator when the result of the multiplying is zero or negative, or when the result of the adding is zero or negative.

22. An apparatus for recording and/or reproducing information by irradiating a recording medium with a light beam, the recording medium having a plurality of tracks arranged in parallel thereon, said apparatus comprising:

an optical system for irradiating one of the tracks with the light beam;

an actuator for moving said optical system relative to the recording medium;

a drive circuit for applying a driving current to said actuator to drive said actuator;

a circuit for generating an error signal indicating an irradiation state of the light beam, from reflected light produced when the light beam irradiates one of the tracks;

an error signal detector for intermittently sampling the error signal a plurality of times to produce a plurality of sampled error signals varying with the movement of said optical system, the error signal periodically varying between a positive value and a negative value with respect to a zero level of the error signal;

a memory for storing the sampled error signals; and a control circuit for estimating an error signal not yet sampled based on a current instantaneous sampled value of an error signal and a previously sampled error signal stored in said memory, for multiplying or adding the estimated error signal and the current instantaneous sampled value of the error signal and for causing said drive circuit to vary the driving current applied to said actuator when the result of the multiplying is zero or negative, or when the result of the adding is zero or negative.

* * * * *

UNITED STATES PATENT AND TRADEMARK OFFICE
CERTIFICATE OF CORRECTION

PATENT NO. : 5,235,577
DATED : August 10, 1993
INVENTOR(S) : TSUKASA OGINO

It is certified that error appears in the above-indentified patent and that said Letters Patent is hereby corrected as shown below:

COLUMN 2
Line 13, "performed" should read --preformed--.
Line 53, "an" should read --a--.

COLUMN 3
Line 12, "parallelly" should be deleted.
Line 13, "arranged" should read --arranged in parallel--.
Line 28, "said" should read --the--.
Line 32, "said" should read --the--.
Line 34, "said" should read --the--.

COLUMN 4
Line 25, "well" should read --will--.

UNITED STATES PATENT AND TRADEMARK OFFICE
CERTIFICATE OF CORRECTION

PATENT NO. : 5,235,577
DATED : August 10, 1993
INVENTOR(S) : TSUKASA OGINO

It is certified that error appears in the above-indentified patent and that said Letters Patent is hereby corrected as shown below:

COLUMN 5
  Line 17, "actual," should read --actuality,--.
  Line 27, "the time" should read --this time--.

COLUMN 6
  Line 21, "other signal," should read --other hand,--.

COLUMN 7
  Line 20, "FIG. 10," should read --FIG. 10A,--.

UNITED STATES PATENT AND TRADEMARK OFFICE
CERTIFICATE OF CORRECTION

PATENT NO. : 5,235,577
DATED : August 10, 1993
INVENTOR(S) : TSUKASA OGINO

It is certified that error appears in the above-indentified patent and that said Letters Patent is hereby corrected as shown below:

COLUMN 8
Line 16, "claims." should read --the claims.--.
Line 20, "thereon" should read --thereon,--.
Line 28, "means." should read --means;--.
Line 59, "claim 1" should read --claim 1,--.

COLUMN 9
Line 1, "and" should read --and/or--.
Line 10, "claim 1" should read --claim 1,--.
Line 16, "thereon" should read --thereon,--.
Line 20, "tracks; means" should read --tracks; ¶ means--.
Line 46, "braking" should read --the braking--.

UNITED STATES PATENT AND TRADEMARK OFFICE
CERTIFICATE OF CORRECTION

PATENT NO. : 5,235,577
DATED : August 10, 1993
INVENTOR(S) : TSUKASA OGINO

It is certified that error appears in the above-indentified patent and that said Letters Patent is hereby corrected as shown below:

COLUMN 10
Line 2, "claim 5" should read --claim 5,--.
Line 7, "thereon" should read --thereon,--.
Line 12, "tracks; means" should read --tracks;
¶ means--.
Line 14, "means" should read --means;--.
Line 54, "and" should read --and/or--.
Line 62, "claim 9" should read --claim 9,--.

UNITED STATES PATENT AND TRADEMARK OFFICE
CERTIFICATE OF CORRECTION

PATENT NO. : 5,235,577
DATED : August 10, 1993
INVENTOR(S) : TSUKASA OGINO

It is certified that error appears in the above-indentified patent and that said Letters Patent is hereby corrected as shown below:

COLUMN 11
Line 4, "tracks; means" should read --tracks;
¶ means--.
Line 5, "light" should read --light beam--.
Line 6, "light" should read --light beam--.
Line 7, "13" should be deleted.
Line 55, "claim 13" should read --claim 13,--.

COLUMN 12
Line 35, "bean" should read --beam--.
Line 39, "bean" should read --beam--.
Line 43, "position" should read --positive--.
Line 57, "negative or the result of the adding is zero or
nega-" should read --negative.--.
Line 58, "tive." should be deleted.

Signed and Sealed this

Twenty-sixth Day of April, 1994

BRUCE LEHMAN

Attest:

Attesting Officer

Commissioner of Patents and Trademarks